US006889566B2

(12) United States Patent
Sato

(10) Patent No.: US 6,889,566 B2
(45) Date of Patent: May 10, 2005

(54) FOIL STRAIN GAUGE

(75) Inventor: Tomoyoshi Sato, Nagano-ken (JP)

(73) Assignee: Mineabea Co., Ltd., Nagano-ken (JP)

( * ) Notice: Subject to any disclaimer, the term of this patent is extended or adjusted under 35 U.S.C. 154(b) by 197 days.

(21) Appl. No.: 10/183,602

(22) Filed: Jun. 27, 2002

(65) Prior Publication Data

US 2003/0010139 A1 Jan. 16, 2003

(30) Foreign Application Priority Data

Jun. 29, 2001 (JP) ......................................... 2001-197979

(51) Int. Cl.$^7$ ................................................ G01L 1/10

(52) U.S. Cl. .............................. 73/862.627; 73/862.04; 73/4

(58) Field of Search ..................... 73/862.627, 862.044, 73/862.045, 862.474

*Primary Examiner*—Edward Lefkowitz
*Assistant Examiner*—Andre Allen
(74) *Attorney, Agent, or Firm*—Thompson Coburn, LLP

(57) ABSTRACT

This invention provides a foil strain gauge having a plurality of sensing portions and a plurality of turnup tabs that are connected to each other through respective turnup portions, each turnup portion having an inner side defining a curve with a curvature that changes continuously and gradually.

4 Claims, 6 Drawing Sheets

(2 of 6 Drawing Sheet(s) Filed in Color)

FOIL STRAIN GAUGE

BACKGROUND OF THE INVENTION

1. Field of the Invention

The present invention relates to an electric resistance type foil strain gauge, and more particularly to a foil strain gauge used in a strain gauge type load cell or various types of strain transducers.

2. Description of the Related Art

FIG. 1 is a plan view showing the configuration of a conventional electric resistance type foil strain gauge.

The conventional electric resistance type foil strain gauge (hereinafter referred to as foil strain gauge) measures a strain by applying a physical phenomenon that the resistance of an electric resistor changes when a strain is applied to the electric resistor. The foil strain gauge is attached to the surface of an object to be measured or is buried therein, detects a strain and transduces it into a quantity of electricity As shown in FIG. 1, the conventional foil strain gauge has a plurality of sensing portions 21 arranged in a loop.

FIG. 2 is an enlarged plan view of part of the conventional foil strain gauge. The foil strain gauge includes a plurality of turnup tabs 22 in addition to the plurality of sensing portions 21. The sensing portions 21 and the turnup tabs 22 are connected to each other through turnup portions 23. The turnup portions 23 each have a semicircular inner side R with a constant curvature.

When stretching force acts on the foil strain gauge, a stress is concentrated on the inner side R of each of the turnup portions 23. This is because stress concentration occurs near a place where the foil strain gauge has its width changing discontinuously. The stress concentration appears clearly when a line width of the metal resistor changes sharply or the ratio of a length L of the turnup tab 22 to a line width W of the sensing portion 21 is large. The stress concentration causes the metal resistor to crack, and the foil strain gauge reaches the end of its fatigue service life.

A fatigue test was performed on the conventional foil strain gauge with an alternating load of 1,500 $\mu$st based on NAS (National Aerospace Standard) 942. The result of the fatigue test shows that cracks were formed in the turnup portions 23 of the metal resistor, and that the foil strain gauge had a short fatigue service life.

FIG. 3 shows a result obtained by subjecting the conventional foil strain gauge to modeling analysis. The turnup portions 23 are caused to crack by the stress concentrated thereon. According to a modeling result obtained by finite element method analysis using three-dimensional CAD, it is confirmed that stress was concentrated on the turnup portion as shown in FIG. 3.

It is known that, in the conventional foil strain gauge, it is possible to adjust by the length L of the turnup tab 22 the so-called creep characteristics that the output value fluctuates with the lapse of time when a predetermined load is kept applied. When a long turnup tab is required in the conventional foil strain gauge with the turnup portion 23 having the semicircular inner side, the creep characteristics can be adjusted, but the fatigue service life is shortened as described above.

FIG. 4 shows another conventional foil strain gauge.

For example, this is a foil strain gauge with a new pattern, which is described in the Journal of Japan Society of Mechanical Engineers, Vol. 77, No. 668, July 1974. In this foil strain gauge, loop-like dynamic approach sections 35 are formed at the ends of sensing portions 31 to improve the service life.

In this conventional foil strain gauge, however, since the pattern size increases, the material cannot be used economically, thereby increasing the manufacturing cost.

SUMMARY OF THE INVENTION

The present invention has been made in consideration of the above situation in the related art, and has as its object to provide a foil strain gauge whose fatigue service life is improved without increasing the pattern size, so a comparatively large strain can be stably measured over a long period of time.

In order to achieve the above object, according to a first aspect of the present invention, there is provided a foil strain gauge comprises a plurality of sensing portions, a plurality of turnup tabs, and a plurality of turnup portions which connect respective sensing portions and respective turnup tabs and each of which has an inner side defining a curve with a curvature that changes continuously and gradually.

According to a second aspect of the present invention, in the foil strain gauge of the first aspect, the inner side defines an elliptic curve.

As is apparent from the above aspects, in the foil strain gauge of the present invention, the fatigue service life can be improved even when a long turnup tab is required to adjust the creep characteristics.

In the foil strain gauge of the present invention, due to the elliptic curve of the inner side described above, the fatigue service life can be improved without increasing the pattern. Therefore, the manufacturing cost can be decreased.

The foil strain gauge of the present invention realizes an incleased service life and stable measurement of a comparatively large strain over a long period of time.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENT

A preferred embodiment of the present invention will be described with reference to the accompanying drawings (FIGS. 5 to 8).

Figure 1:
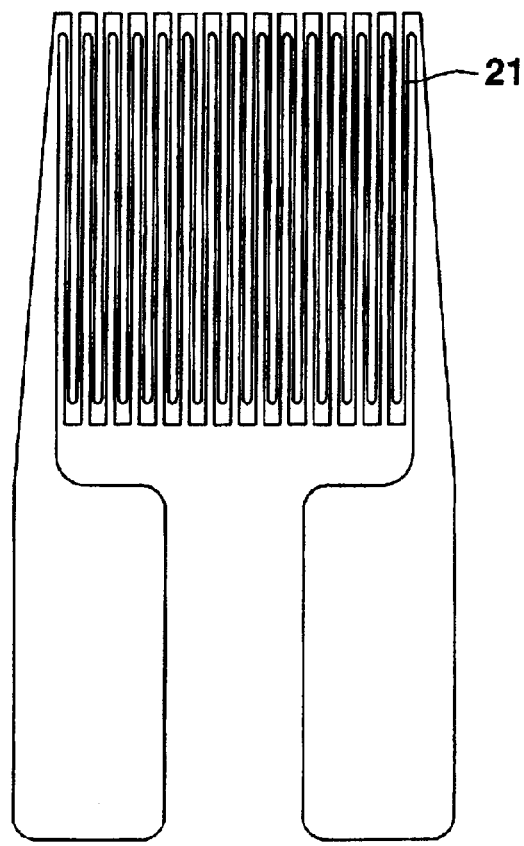
FIG. 1 is a plan view showing the configuration of a conventional foil strain gauge.
Figure 2:
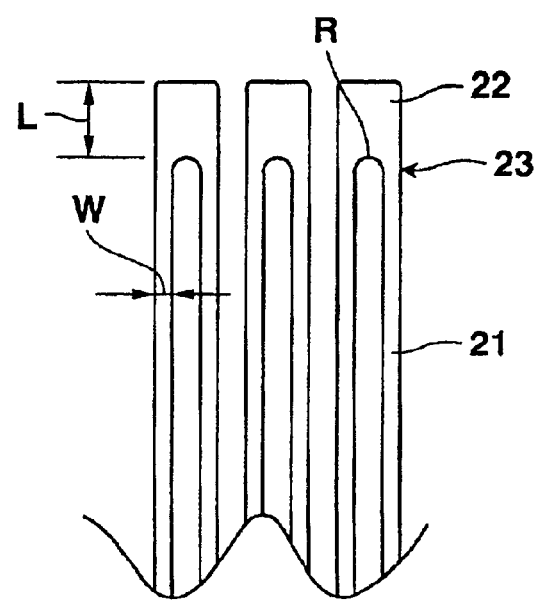
FIG. 2 is an enlarged plan view of part of the conventional foil strain gauge.
Figure 3:
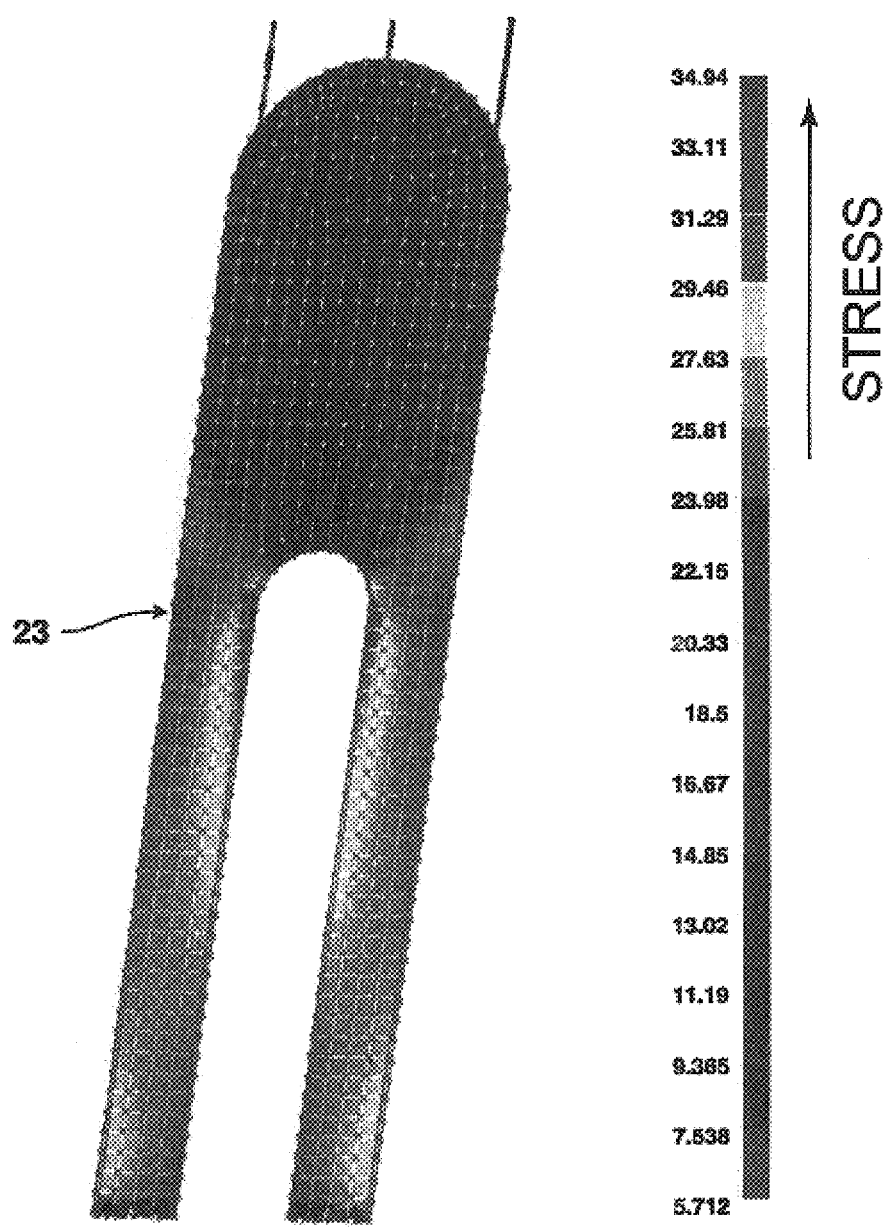
FIG. 3 is a view showing a result obtained by subjecting the conventional foil strain gauge to modeling analysis.
Figure 4:
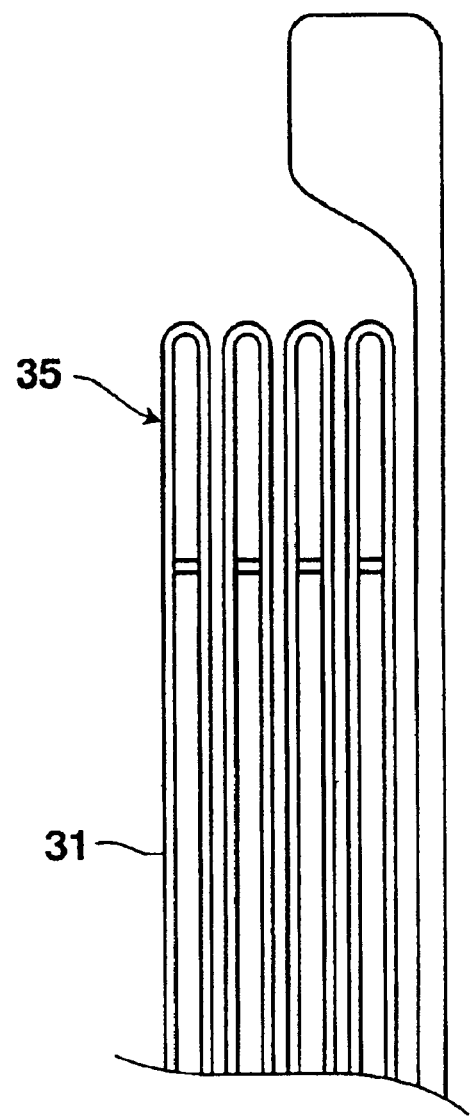
FIG. 4 is an enlarged plan view showing part of another conventional foil strain gauge.
Figure 5:
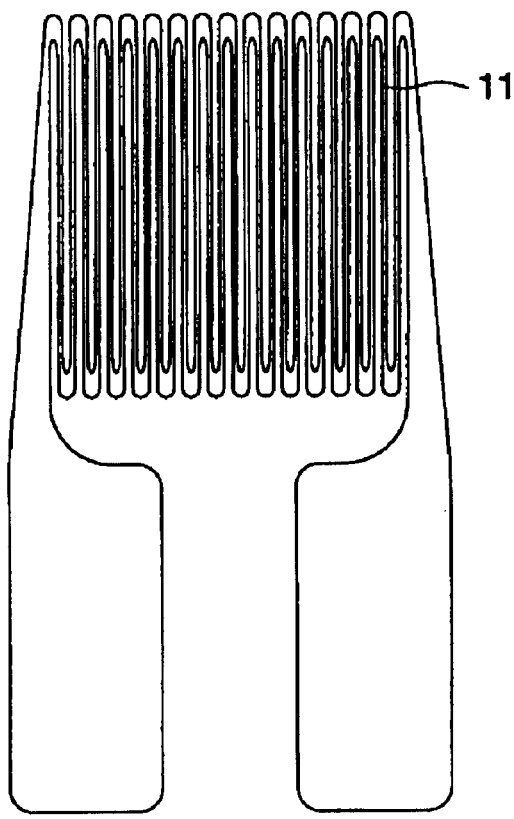
FIG. 5 is a plan view showing the configuration of a foil strain gauge of the present invention.

Referring to FIG. 5, a foil strain gauge according to the present invention uses a foil-like metal resistor including a plurality of sensing portions 11 with a loop arrangement.

Figure 6:
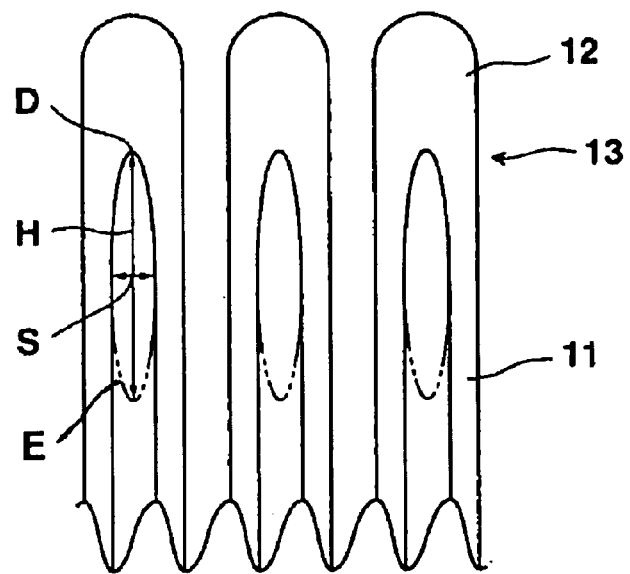
FIG. 6 is an enlarged plan view of part of the foil strain gauge of the present invention.

Referring to FIG. 6, the foil strain gauge of the present invention has a plurality of turnup tabs 12 in addition to the plurality of sensing portions 11, and the sensing portions 11 and turnup tabs 12 are connected to each other through turnup portions 13. The turnup portions 13 each have an inner side defining an elliptic curve D.

In this manner, the foil strain gauge of the present invention is characterized by the turnup portions 13 each having the inner side defining the elliptic curve D. When a stretching force acts on the foil strain gauge of the present invention, a stress is concentrated on each of the turnup portions 13. Since the inner side of each turnup portion 13 has the elliptic curve D, the stress acting on the each turnup portion 13 is dispersed and reduced, so the fatigue service life can be improved.

When the curvature of the elliptic curve D increases, the stress concentration descreases. However, as the metal foil is patterned by etching, the elliptic curve D of each turnup portion 13 must be formed such that its vertex does not have an acute angle.

Figure 7:
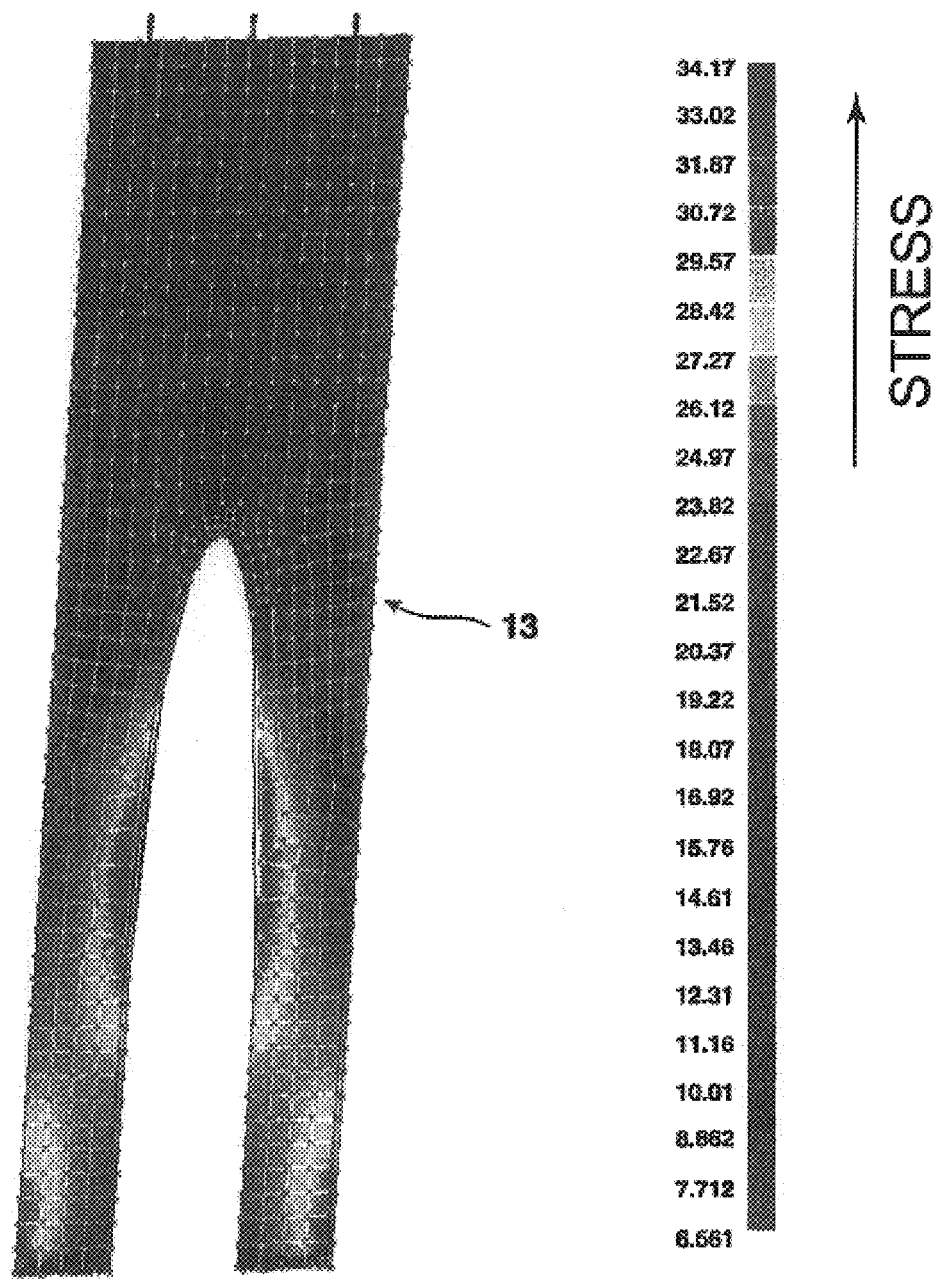
FIG. 7 is a view showing a result obtained by subjecting the foil strain gauge of the present invention to modeling analysis.

Referring to FIG. 7, the modeling result obtained by finite element method analysis using three-dimensional CAD indicates the stress is dispersed due to the elliptic curve D of the each turnup portion 13.

Table 1 below shows the stress weakened due to the elliptic curve of the turnup portion of the present invention with reference to the stress at the conventional turnup portion as 100.

TABLE 1

| Length Ratio Minor Axis S:Major Axis H | Stress at Each Turnup Portion |
|---|---|
| 1:1 | 100 |
| 1:2 | 99 |
| 1:5 | 97 |
| 1:6 | 95 |
| 1:7 | 91 |

TABLE 1-continued

| Length Ratio Minor Axis S:Major Axis H | Stress at Each Turnup Portion |
|---|---|
| 1:8 | 87 |
| 1:10 | 85 |
| 1:20 | 68 |

The stress at the each turnup portion is shown with respect to the ratio in length of a major axis H to a minor axis S of the ellipse E defining the elliptic curve D shown in FIG. 6. As the ratio in the length of the major axis H to the minor axis S increases, the stress concentrating on the each turnup portion decreases. S:H in the foil strain gauge of the present invention used in the test is always 1:6.

Figure 8:
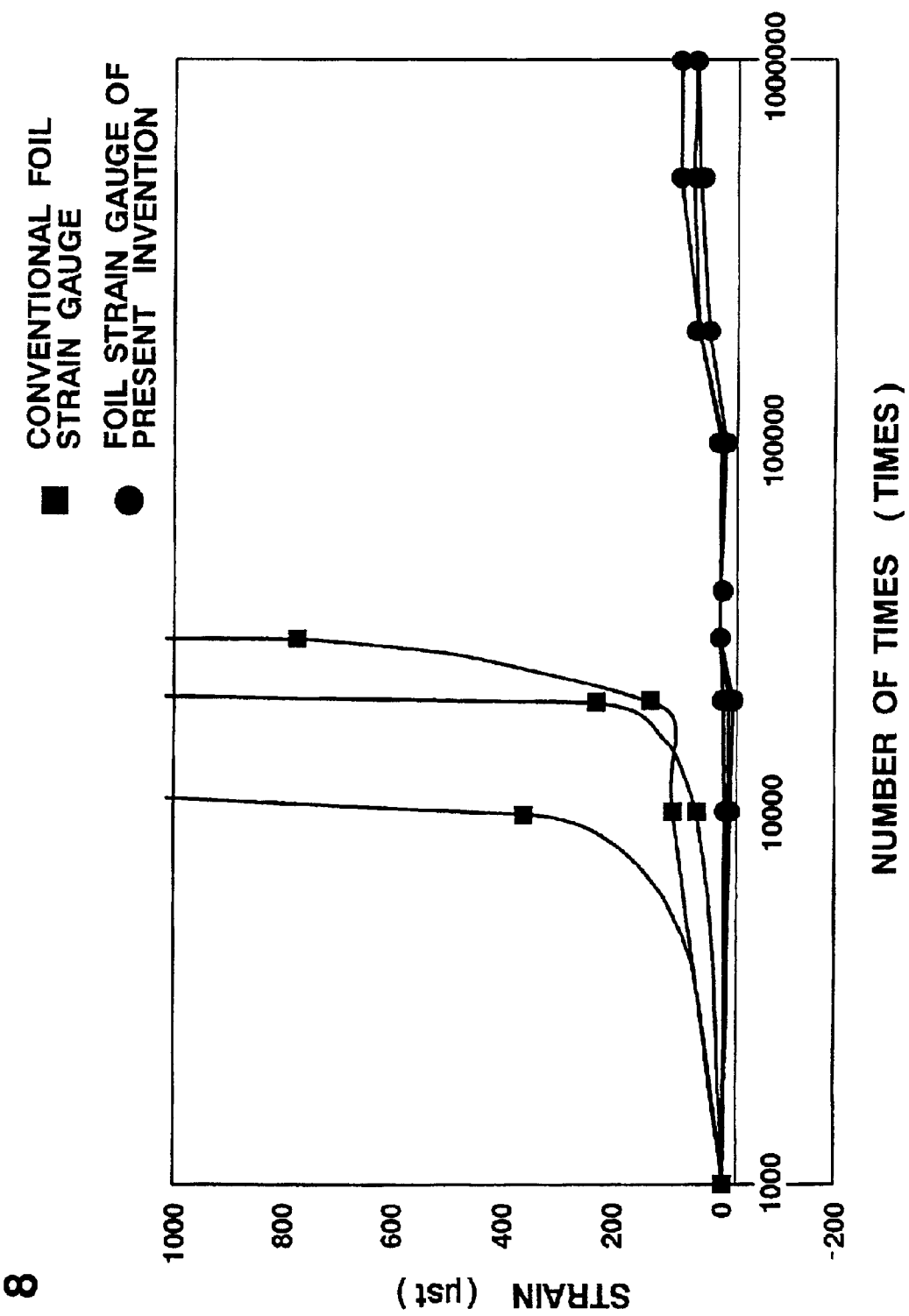
FIG. 8 is a graph showing the result of NAS 942 fatigue test performed on the foil strain gauge of the present invention and the conventional foil strain gauge.

Referring to FIG. 8, while the conventional foil strain gauge reaches the end of the fatigue service life with strains of 50,000 times or less, the foil strain gauge of the present invention survives strains of 1,000,000 times or more.

In the above embodiment, the inner side of each turnup portion 13 has the elliptic curve D. However, the present invention is not limited to this, as far as the inner side defines a curve with a curvature that changes continuously and gradually.

What is claimed is:

1. A foil strain gauge comprising:
   a plurality of sensing portions;
   a plurality of turnup tabs; and
   a plurality of turnup portions, which connect respective sensing portions of the strain gauge and respective turnup tabs, of the strain gauge and each of which has an inner side defining a curve with a curvature that changes continuously and gradually.

2. A gauge according to claim 1, wherein the inner side defines an elliptic curve.

3. A gauge according to claim 2, wherein the elliptic curve is defines at least in part an ellipse (E) having a major axis (H) that is larger than a lateral width of the inner side, and wherein the inner side lateral width corresponds to a minor axis (S) of the ellipse (E).

4. A gauge according to claim 1, wherein the curvature reduces continuously and gradually toward a vertex of the curve.

* * * * *